UNITED STATES PATENT OFFICE.

FRITZ HOFMANN AND CARL COUTELLE, OF ELBERFELD, GERMANY, ASSIGNORS TO FARBENFABRIKEN VORM. FRIEDR. BAYER & CO., OF ELBERFELD, GERMANY, A CORPORATION OF GERMANY.

CAOUTCHOUC SUBSTANCE AND PROCESS OF MAKING SAME.

1,069,951.     Specification of Letters Patent.     Patented Aug. 12, 1913.

No Drawing.     Application filed August 24, 1910. Serial No. 578,607.

*To all whom it may concern:*

Be it known that we, FRITZ HOFMANN and CARL COUTELLE, doctors of philosophy, chemists, citizens of the German Empire, residing at Elberfeld, Germany, have invented new and useful Improvements in Caoutchouc Substances and Processes of Making Same, of which the following is a specification.

We have found that the hydrocarbon known as erythrene (divinyl):

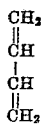

the simplest hydrocarbon of the erythrene series, which series is characterized by containing the nucleus graphically represented $C=C-C=C$, can be converted by polymerization into a new caoutchouc substance which may replace natural caoutchouc in its chemical and technical applications.

The process for producing the new caoutchouc substance consists in heating erythrene (divinyl) in an appropriate manner so that the new caoutchouc substance is mainly produced. The process may also be carried out in the presence of agents which promote polymerization or which act as diluents.

In order to illustrate our invention the following examples are given, the parts being by weight:—

Example A: 500 parts of erythrene are dissolved in benzene and the resulting solution is heated for 10 hours in an autoclave to 150° C. The benzene and the by-products which may have been formed, are distilled over with steam and the polymerization product in the form of an elastic substance remains behind.

Example B: 200 parts of erythrene are liquefied by cooling *e. g.* with a mixture of ether and solid or liquid carbonic acid. The resulting liquid is then heated in an autoclave for four days at from 90–100° C. Unchanged erythrene is removed and the residue is heated for some time *in vacuo* on the water bath, the temperature of which is finally brought to boiling. On distillation a liquid distils over, while the new product remains behind.

Example C: 300 parts of erythrene are liquefied by cooling, 5 parts of acetic acid are added and the mixture is heated during 2 days in an autoclave to 100° C. The new caoutchouc substance is isolated as above described.

Example D: 100 parts of erythrene are heated in an autoclave for some time *e. g.* 3 months in an incubator to about 35° C. The new caoutchouc substance is isolated as above described.

The new caoutchouc substance is a white substance insoluble in acetone. It swells up with chloroform or benzene to a white hyaline substance from which the liquid can be poured off. It is free from protein substances, which are always contained in the natural caoutchouc and play an important part in it with regard to the elasticity of the natural caoutchouc. It forms ozonides, nitrosites, brom addition products of which the following are the most characteristic: The nitrosite is a light yellow powder decomposing at 150 to 155° C. assuming a dark brown coloration; the ozonide is a thick colorless oil which puffs up on heating in the free flame and on being boiled with water it gives the peroxid of hydrogen reaction with bichromate of potassium or titanic acid and it is split into succinic acid and succinic aldehyde which latter substance gives a diphenylhydrazone melting at 125° C.

Our method of polymerization may also be applied to mixtures of erythrene and hydrocarbons of the erythrene series and of similar groups in various proportions and the thus formed mixtures of new caoutchouc substances may be employed in the arts.

Our new caoutchouc substance described herein may be vulcanized, such vulcanized caoutchouc substances may be used in the same manner as vulcanized natural caoutchouc. We can also use a mixture of our new caoutchouc substance described herein with any other caoutchouc substance for example with those described in our other application Ser. No. 578,608 filed August 24, 1910 and subject such mixtures to vulcanization, or we may mix our new caoutchouc substance with natural caoutchouc and subject this mixture to vulcanization. The vulcanized erythrene caoutchoucs are whitish to grayish products.

We claim:—

1. The process of producing a caoutchouc-like substance from erythrene which comprises subjecting erythrene to caoutchouc-forming conditions until a caoutchouc-like substance results insoluble in acetone.

2. The process of producing a caoutchouc-like substance from erythrene which comprises heating erythrene under caoutchouc forming conditions until a product results insoluble in acetone.

3. The process of producing a caoutchouc-like substance which comprises polymerizing erythrene in the presence of an agent which promotes the polymerization until a caoutchouc-like substance results insoluble in acetone.

4. The process of producing a caoutchouc-like substance which comprises heating erythrene under caoutchouc forming conditions in the presence of an agent which promotes the polymerization until a caoutchouc-like substance results insoluble in acetone.

5. The process of producing a caoutchouc-like substance from erythrene which comprises heating erythrene under pressure until a caoutchouc-like substance results insoluble in acetone.

6. The process of producing a caoutchouc-like substance from erythrene which comprises heating erythrene under pressure in the presence of an agent which promotes the polymerization until a caoutchouc-like substance results insoluble in acetone.

7. The process of producing a caoutchouc-like substance which comprises polymerizing erythrene in the presence of an agent of acid reaction until a caoutchouc-like substance results insoluble in acetone.

8. The process of producing a caoutchouc-like substance which comprises heating erythrene under caoutchouc forming conditions in the presence of an agent of acid reaction until a caoutchouc-like substance results insoluble in acetone.

9. The process of producing a caoutchouc-like substance which comprises polymerizing erythrene in the presence of an acid until a caoutchouc-like substance results insoluble in acetone.

10. The process of producing a caoutchouc-like substance which comprises heating erythrene under caoutchouc forming conditions in the presence of an acid until a caoutchouc-like substance results insoluble in acetone.

11. The process of producing a caoutchouc-like substance which comprises polymerizing erythrene in the presence of an organic acid until a caoutchouc-like substance results insoluble in acetone.

12. The process of producing a caoutchouc-like substance which comprises heating erythrene under caoutchouc forming conditions in the presence of an organic acid until a caoutchouc-like substance results insoluble in acetone.

13. The process of producing a caoutchouc-like substance which comprises polymerizing erythrene in the presence of an alifatic acid until a caoutchouc-like substance results insoluble in acetone.

14. The process of producing a caoutchouc-like substance which comprises heating erythrene under caoutchouc forming conditions in the presence of an alifatic acid until a caoutchouc-like substance results insoluble in acetone.

15. The process of producing a caoutchouc-like substance which comprises polymerizing erythrene under caoutchouc forming conditions in the presence of acetic acid until a caoutchouc-like substance results insoluble in acetone.

16. The process of producing a caoutchouc-like substance which comprises heating erythrene in the presence of acetic acid until a caoutchouc-like substance results insoluble in acetone.

17. The process of producing a caoutchouc-like substance which comprises adding to erythrene a liquid diluent, and polymerizing until a caoutchouc-like substance results insoluble in acetone.

18. The process of producing a caoutchouc-like substance which comprises adding to erythrene a liquid diluent and heating until a caoutchouc-like substance results insoluble in acetone.

19. The process of producing a caoutchouc-like substance which comprises adding to erythrene a liquid diluent, polymerizing the thus diluted erythrene under caoutchouc-forming conditions until a caoutchouc-like substance results insoluble in acetone, and separating the caoutchouc-like polymerization product.

20. The process of producing a caoutchouc-like substance which comprises adding to erythrene a liquid diluent, polymerizing the thus diluted erythrene by heating under caoutchouc forming conditions until a caoutchouc-like substance results insoluble in acetone and separating the caoutchouc-like polymerization product.

21. The process of producing a caoutchouc-like substance which comprises polymerizing erythrene under caoutchouc-forming conditions until a caoutchouc-like substance results insoluble in acetone, and separating the resulting caoutchouc-like substance from the by-products of the polymerization product.

22. The process of producing a caoutchouc-like substance which comprises polymerizing erythrene under caoutchouc-forming conditions until a caoutchouc-like substance results insoluble in acetone, and separating the volatile constituents from the resulting product by distillation.

23. The process of producing a caoutchouc-like substance which comprises polymerizing erythrene by heating under caoutchouc-forming conditions until a caoutchouc-like substance results insoluble in acetone and separating the volatile constituents from the resulting product by distillation with steam.

24. The process of producing a caoutchouc-like substance which comprises polymerizing an erythrene hydrocarbon under caoutchouc forming conditions until a caoutchouc-like substance results insoluble in acetone and separating the volatile constituents from the resulting product by distillation with steam.

25. The process of producing a caoutchouc-like substance which comprises heating an erythrene hydrocarbon under caoutchouc forming conditions until a caoutchouc-like substance results insoluble in acetone, and separating the volatile constituents from the resulting product by distillation with steam.

26. As a new product a caoutchouc-like substance comprising erythrene caoutchouc.

27. As a new product erythrene caoutchouc, being a polymerization product of erythrene which caoutchouc forms an ozonid which yields upon decomposition with water, succinic aldehyde among its decomposition products.

28. As a new product a caoutchouc-like substance comprising a caoutchouc-like polymerization product of an erythrene hydrocarbon the ratio of carbon to hydrogen in such caoutchouc being greater than that in isoprene caoutchouc.

29. New caoutchouc substances comprising erythrene caoutchouc obtained by polymerization of erythrene which are characterized by being whitish substances the color of which does not change, swelling up with chloroform to whitish hyaline substances, and forming nitrosites and ozonids which are thick oils being decomposed on being heated, which new caoutchouc substances in the vulcanized form are whitish to grayish products which are not adhesive and the ozonids formed from which yield upon decomposition with water succinic aldehyde among the decomposition products, substantially as described.

In testimony whereof we have hereunto set our hands in the presence of two subscribing witnesses.

FRITZ HOFMANN. [L. S.]
CARL COUTELLE. [L. S.]

Witnesses:
CHAS. J. WRIGHT,
ALFRED HENKEL.